(12) United States Patent
Inoue

(10) Patent No.: US 11,208,740 B2
(45) Date of Patent: Dec. 28, 2021

(54) METHOD FOR PRODUCING CARBON NANOTUBE YARN

(71) Applicant: HITACHI ZOSEN CORPORATION, Osaka (JP)

(72) Inventor: Tetsuya Inoue, Osaka (JP)

(73) Assignee: HITACHI ZOSEN CORPORATION, Osaka (JP)

( * ) Notice: Subject to any disclaimer, the term of this patent is extended or adjusted under 35 U.S.C. 154(b) by 824 days.

(21) Appl. No.: 16/073,462

(22) PCT Filed: Jan. 26, 2017

(86) PCT No.: PCT/JP2017/002627
§ 371 (c)(1),
(2) Date: Jul. 27, 2018

(87) PCT Pub. No.: WO2017/131061
PCT Pub. Date: Aug. 3, 2017

(65) Prior Publication Data
US 2021/0002794 A1 Jan. 7, 2021

(30) Foreign Application Priority Data
Jan. 29, 2016 (JP) .............................. JP2016-016318

(51) Int. Cl.
B32B 9/00 (2006.01)
D01F 9/127 (2006.01)
(Continued)

(52) U.S. Cl.
CPC ............ *D01F 9/127* (2013.01); *C01B 32/162* (2017.08); *C01B 32/168* (2017.08); *D02G 3/16* (2013.01);
(Continued)

(58) Field of Classification Search
CPC ....... B82Y 30/00; B32B 9/007; Y10T 428/30; Y10S 977/742
(Continued)

(56) References Cited

U.S. PATENT DOCUMENTS 7,045,108 B2    5/2006  Jiang et al.
2009/0153502 A1*  6/2009  Jiang .................... G06F 3/0446
                                                    345/173

(Continued)

FOREIGN PATENT DOCUMENTS

CN    101967699 A    2/2011
CN    105189840 A    12/2015
(Continued)

OTHER PUBLICATIONS

International Preliminary Report on Patentability PCT/JP2017/002627 dated Jul. 31, 2018 with English translation.
(Continued)

*Primary Examiner* — Daniel H Miller
(74) *Attorney, Agent, or Firm* — Pillsbury Winthrop Shaw Pittman, LLP

(57) ABSTRACT

The method for producing a carbon nanotube yarn includes preparing a vertically-aligned carbon nanotube that is disposed on a substrate and is aligned vertically to the substrate; preparing a rotating body having a groove on a circumferential face; drawing a plurality of carbon nanotubes from the vertically-aligned carbon nanotube continuously and linearly to prepare a carbon nanotube single yarn, and arranging the plurality of carbon nanotube single yarns in parallel to prepare a carbon nanotube web; winding the carbon nanotube web around the circumferential face of the rotating body so as to fit in the groove; and drawing the carbon nanotube web from the rotating body.

8 Claims, 7 Drawing Sheets

(51) Int. Cl.
*C01B 32/162* (2017.01)
*C01B 32/168* (2017.01)
*D02G 3/16* (2006.01)
*B82Y 40/00* (2011.01)
*B82Y 30/00* (2011.01)

(52) U.S. Cl.
CPC ............... *B82Y 30/00* (2013.01); *B82Y 40/00* (2013.01); *C01B 2202/06* (2013.01); *C01B 2202/08* (2013.01); *Y10T 428/30* (2015.01)

(58) Field of Classification Search
USPC .......................................... 428/408; 423/448
See application file for complete search history.

(56) References Cited

U.S. PATENT DOCUMENTS

| | | |
|---|---|---|
| 2010/0308489 A1 | 12/2010 | Feng et al. |
| 2011/0052478 A1 | 3/2011 | Feng et al. |
| 2014/0217643 A1 | 8/2014 | Nikawa et al. |
| 2016/0153124 A1 | 6/2016 | Yano et al. |
| 2016/0201229 A1 | 7/2016 | Yano |

FOREIGN PATENT DOCUMENTS

| | | |
|---|---|---|
| JP | 3868914 B2 | 10/2006 |
| JP | 2008-523254 A | 7/2008 |
| JP | 2010-116632 | 5/2010 |
| JP | 2010-281025 A | 12/2010 |
| JP | 2011-046604 A | 3/2011 |
| JP | 2011-207646 | 10/2011 |
| JP | 2011-208296 | 10/2011 |
| JP | 2014-169521 A | 9/2014 |
| TW | 201506214 A | 2/2015 |
| WO | 2007/015710 A2 | 2/2007 |
| WO | 2008/022129 A2 | 2/2008 |
| WO | 2015/011768 A1 | 1/2015 |
| WO | 2015/083701 A1 | 6/2015 |

OTHER PUBLICATIONS

Extended European Search Report issued in corresponding EP Application No. 17744291.0 dated Jul. 1, 2019.
Wei Liu et al., "Poly(vinyl alcohol) reinforced with large-diameter carbon nanotubes via spray winding", Composites: Part A 43 (2012) pp. 587-592.
International Search Report PCT/JP2017/002627 dated Apr. 4, 2017 with English translation.

* cited by examiner

METHOD FOR PRODUCING CARBON NANOTUBE YARN

CROSS-REFERENCE TO RELATED APPLICATIONS

This is the U.S. National Stage of PCT/JP2017/002627, filed Jan. 26, 2017, which in turn claims priority to Japanese Patent Application No. 2016-016318, filed Jan. 29, 2016, the contents of each of these applications being incorporated herein by reference in their entireties.

TECHNICAL FIELD

The present invention relates to a method for producing a carbon nanotube yarn.

BACKGROUND ART

A carbon nanotube is known to have an excellent mechanical strength, thermal conductivity, and electric conductivity. Carbon nanotube yarns formed of a plurality of carbon nanotubes have been studied as a raw material for various industrial products.

For such a method for producing a carbon nanotube yarn, for example, Patent Document 1 has proposed a method for producing a nanofiber twisted yarn. In the method, a nanotube sheet of continuous carbon nanotube is taken out from a nanotube forest grown on a substrate, and the nanotube sheet is twisted (for example, see Patent Document 1 below).

CITATION LIST

Patent Document

[Patent Document 1]
Japanese Unexamined Patent Application Publication (Translation of PCT Application) 2008-523254

SUMMARY OF THE INVENTION

Problem to be Solved by the Invention

However, in the method for producing a nanofiber twisted yarn described in Patent Document 1, the nanotube sheet is drawn from the nanotube forest, and the nanotube sheet is twisted as is. Therefore, it is difficult to conduct various treatments to the nanotube sheet, for example, densifying treatment before the nanotube sheet is twisted. Therefore, density of the nanotube sheet cannot be improved, and improvement in density of the nanofiber twisted yarn is limited.

As a result, with such nanofiber twisted yarns, mechanical strength, thermal conductivity, and electrical conductivity suitable for application cannot be sufficiently ensured, and particularly, improvement in mechanical strength is limited.

An object of the present invention is to provide a method for producing a carbon nanotube yarn, with which various treatments can be conducted smoothly and easily to the carbon nanotube web, and a high-density carbon nanotube yarn can be produced smoothly.

Means for Solving the Problem

The present invention [1] includes a method for producing a carbon nanotube yarn, the method including the steps of: preparing a vertically-aligned carbon nanotube that is disposed on a substrate and is aligned vertically to the substrate; preparing a rotating body having a groove on a circumferential face; drawing a plurality of carbon nanotubes from the vertically-aligned carbon nanotube continuously and linearly to prepare a carbon nanotube single yarn, and arranging the plurality of carbon nanotube single yarns in parallel to prepare a carbon nanotube web; winding the carbon nanotube web around the circumferential face of the rotating body so as to fit in the groove; and drawing the carbon nanotube web from the rotating body.

With this method, the carbon nanotube web, in which the plurality of carbon nanotube single yarns are arranged in parallel, is wound around the circumferential face of the rotating body to be fitted in the groove, and therefore the carbon nanotube web fitted in the groove can be subjected to various processes smoothly and easily.

Thereafter, the carbon nanotube web is drawn from the rotating body to produce a carbon nanotube yarn. Therefore, density of the carbon nanotube yarn can be improved, and a high density carbon nanotube yarn can be produced smoothly.

The present invention [2] includes the method for producing a carbon nanotube yarn of [1] above, wherein the carbon nanotube web drawn from the rotating body is twisted.

With this method, the carbon nanotube web is drawn from the rotating body and twisted, and therefore density of the twisted carbon nanotube yarn can be improved.

The present invention [3] includes the method for producing a carbon nanotube yarn of [1] or [2] above, wherein in the step of winding the carbon nanotube web around the circumferential face of the rotating body, the carbon nanotube web is fitted in the groove to converge the plurality of carbon nanotube single yarns adjacent to each other in the parallel arrangement direction of the plurality of carbon nanotube single yarns.

With this method, with an easy method of winding the carbon nanotube web around the circumferential face of the rotating body so as to fit in the groove, the plurality of carbon nanotube single yarns can be converged. Therefore, with an easy method, density of the carbon nanotube web can be improved, and also density of the carbon nanotube yarn can be improved.

The present invention [4] includes the method for producing a carbon nanotube yarn of any one of [1] to [3] above, further including the step of applying a pressure to the carbon nanotube web wound around the circumferential face of the rotating body from outer side in the diameter direction of the rotating body.

With this method, a pressure is applied to the carbon nanotube web wound around the circumferential face of the rotating body from outer side in diameter direction of the rotating body, and therefore with an easy method, density of the carbon nanotube web can be reliably improved, and also, density of the carbon nanotube yarn can be reliably improved.

The present invention [5] includes the method for producing a carbon nanotube yarn of any one of [1] to [4] above, further including the step of supplying a volatile liquid and/or resin material to the carbon nanotube web wound around the circumferential face of the rotating body.

With this method, the volatile liquid and/or resin material is supplied to the carbon nanotube web wound around the circumferential face of the rotating body, and therefore in the carbon nanotube web, the plurality of carbon nanotube single yarns are densified, and the plurality of carbon nanotubes in the carbon nanotube single yarn are densified.

Therefore, density of the carbon nanotube web can be improved even more reliably with an easy method, and also density of the carbon nanotube yarn can be improved even more.

The present invention [6] includes the method for producing a carbon nanotube yarn of any one of [1] to [5] above, wherein in the step of preparing the vertically-aligned carbon nanotube, the vertically-aligned carbon nanotubes are prepared in a plural number; in the step of preparing the carbon nanotube web, the plurality of carbon nanotube webs are prepared from the plurality of vertically-aligned carbon nanotubes; and in the step of winding the carbon nanotube web around the rotating body, the plurality of carbon nanotube webs are wound around the circumferential face of the rotating body so as to be stacked in the diameter direction of the rotating body.

With this method, the plurality of carbon nanotube webs are prepared from the plurality of vertically-aligned carbon nanotubes, and the carbon nanotube webs are wound around the circumferential face of the rotating body so as to fit in the groove and stacked in the diameter direction of the rotating body.

Thereafter, the stacked carbon nanotube web is drawn from the rotating body to produce the carbon nanotube yarn, and therefore density of the carbon nanotube yarn can be improved, and diameter of the carbon nanotube yarn can be increased. As a result, mechanical strength of the carbon nanotube yarn can be improved even more.

The present invention [7] includes the method for producing a carbon nanotube yarn of any one of [1] to [6] above, wherein in the step of preparing the carbon nanotube web, the plurality of carbon nanotube webs are prepared from the vertically-aligned carbon nanotube; and in the step of winding the carbon nanotube web around the rotating body, the plurality of carbon nanotube webs are wound around the circumferential face of the rotating body so as to be stacked in the diameter direction of the rotating body.

With this method, the plurality of carbon nanotube webs are prepared from one vertically-aligned carbon nanotube, and the carbon nanotube webs are wound around the circumferential face of the rotating body so as to fit in the groove and stacked in the diameter direction of the rotating body.

Therefore, the plurality of carbon nanotube single yarns can be reliably converged compared with the case where one carbon nanotube web is prepared from one vertically-aligned carbon nanotube, and the carbon nanotube web is wound around the circumferential face of the rotating body so as to fit in the groove and the plurality of carbon nanotube single yarns are collectively converged in the parallel arrangement direction. As a result, density of the carbon nanotube web can be improved even more reliably.

The present invention [8] includes the method for producing a carbon nanotube yarn of any one of [1] to [7] above, wherein in the step of winding the carbon nanotube web around the rotating body, along with the carbon nanotube web, an elongated member is wound around the circumferential face of the rotating body.

With this method, along with the carbon nanotube web, the elongated member is wound around the circumferential face of the rotating body, and therefore with an easy method, the carbon nanotube web can be combined with the elongated member. Furthermore, the carbon nanotube yarn is produced from the carbon nanotube web combined with the elongated member, and therefore characteristics of the elongated member can be given to the carbon nanotube yarn.

The present invention [9] includes a carbon nanotube yarn production device including a rotating body, wherein the rotating body has a groove on a circumferential face, and a carbon nanotube web is wound around the rotating body so that the carbon nanotube web is fitted in the groove, and in the carbon nanotube web, the plurality of carbon nanotube single yarns are arranged in parallel; and a twister that twists the carbon nanotube web drawn from the rotating body.

Such a configuration includes the rotating body having the groove on the circumferential face, and therefore the carbon nanotube web formed with the plurality of carbon nanotube single yarns arranged in parallel can be wound around the circumferential face of the rotating body so as to fit in the groove.

Therefore, the carbon nanotube web fitted in the groove can be subjected to various processes smoothly and easily. Thereafter, the twister can twist the carbon nanotube web drawn from the rotating body, and therefore a high density carbon nanotube yarn can be produced smoothly.

The present invention [10] includes the carbon nanotube yarn production device of the [8] above, including a presser that presses the carbon nanotube web wound around the rotating body so that the carbon nanotube web is sandwiched between the rotating body and the presser.

Such a configuration includes the presser that presses the carbon nanotube web wound around the rotating body, and therefore density of the carbon nanotube web can be improved, and density of the carbon nanotube yarn can be reliably improved.

The present invention [11] includes the carbon nanotube yarn production device of [8] or [9] above, including a feeder that feeds a volatile liquid to the carbon nanotube web wound around the rotating body.

Such a configuration includes the feeder that feeds the volatile liquid to the carbon nanotube web wound around the rotating body, and therefore density of the carbon nanotube web can be reliably improved, and also density of the carbon nanotube yarn can be improved even more.

Effects of the Invention

With the method for producing a carbon nanotube yarn of the present invention, the carbon nanotube web can be subjected to various treatments smoothly and easily, and a high density carbon nanotube yarn can be produced smoothly.

DESCRIPTION OF EMBODIMENTS

In the method for producing a carbon nanotube yarn of the present invention, the carbon nanotube web is wound around the roller so as to fit in the groove of the rotating body, and thereafter drawn from the rotating body to produce a high density carbon nanotube yarn smoothly.

First Embodiment

Figure 2:
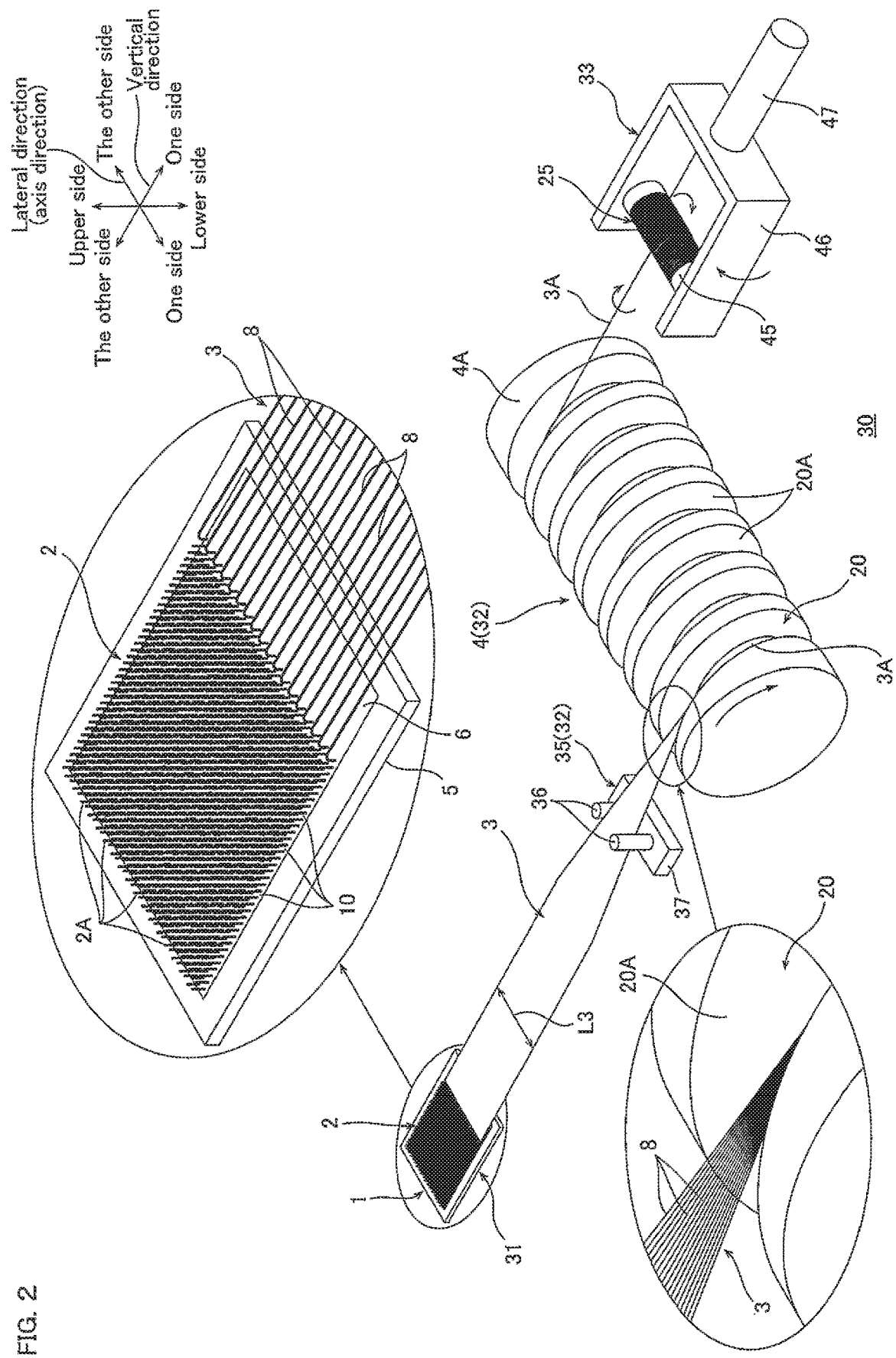
FIG. 2 shows a perspective view of a yarn production device as a first embodiment of the CNT yarn production device of the present invention.
Figure 3A:
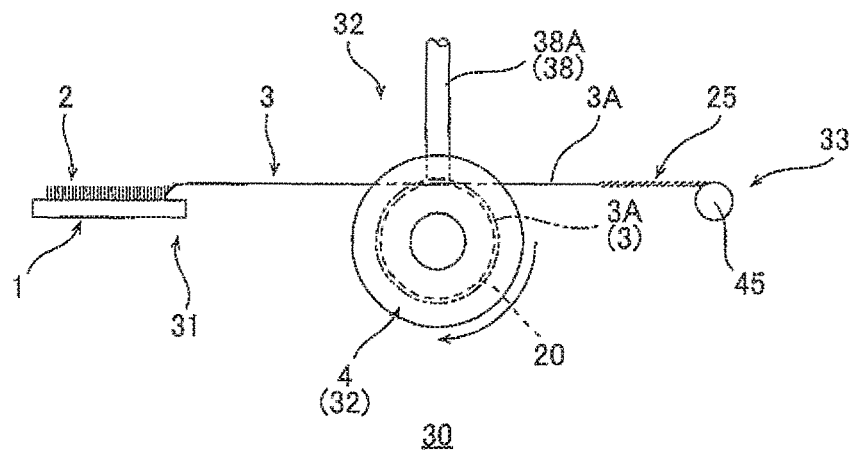
FIG. 3A is a schematic diagram of the yarn production device shown in FIG. 2, seen from the axial direction of a roller.
Figure 3B:
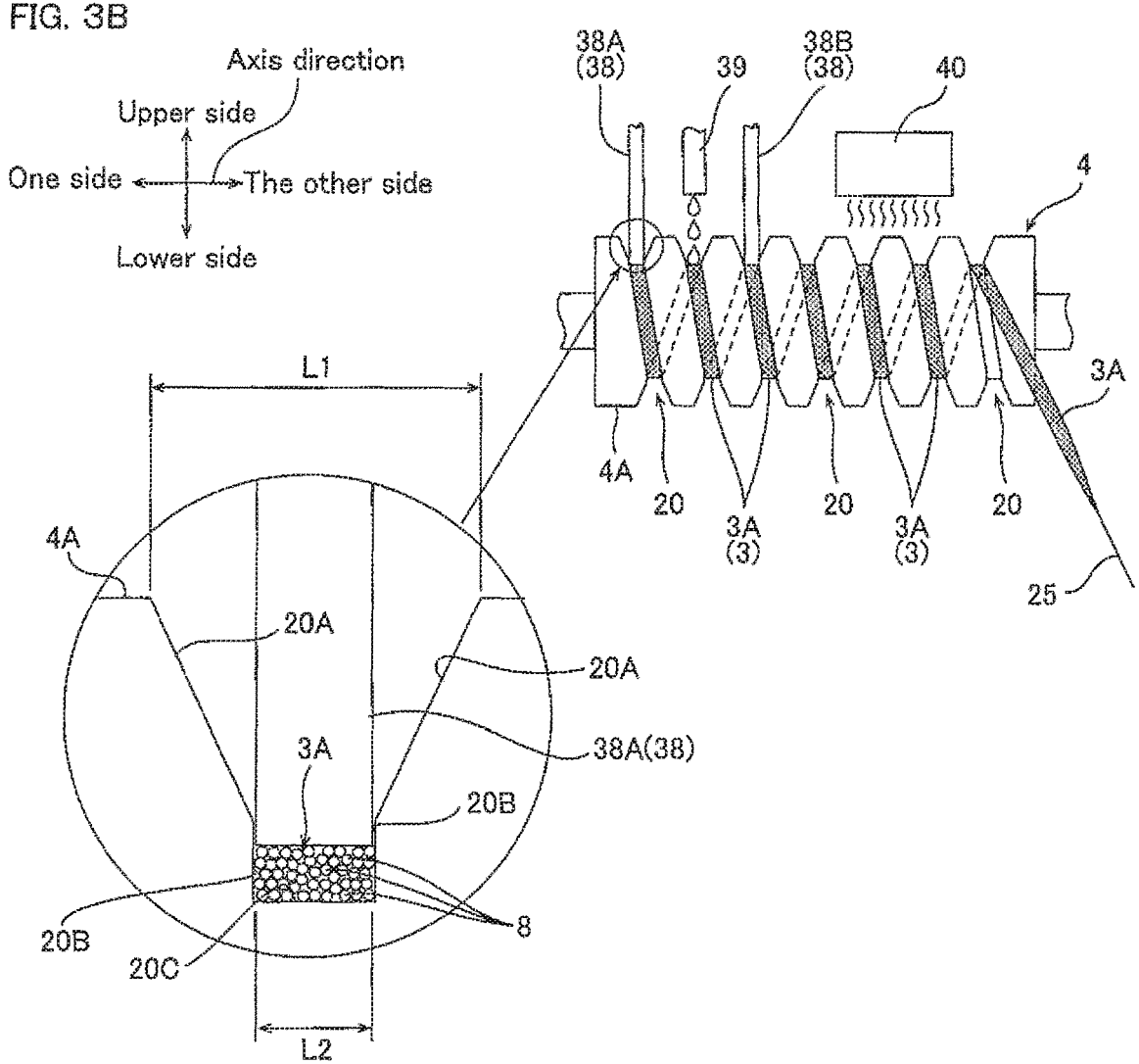
FIG. 3B is a schematic diagram of the converging unit shown in FIG. 3A.

The first embodiment of the method for producing a carbon nanotube yarn of the present invention is described with reference to FIG. 1 to FIG. 3. The first embodiment of the method for producing a carbon nanotube twisted yarn (an embodiment of carbon nanotube yarn) includes, for example, as shown in FIG. 2 to FIG. 3B, preparing vertically-aligned carbon nanotubes 2 (in the following, referred to as VACNTs 2) disposed on a substrate 1, preparing a roller 4 as an example of a rotating body, preparing a carbon nanotube web 3 (in the following, referred to as CNT web 3) from the VACNTs 2, winding the CNT web 3 on a circumferential face 4A of the roller 4, drawing the CNT web 3 from the roller 4, and then twisting.

In this production method, for example, as shown in FIG. 1A to FIG. 1D, the VACNTs 2 are allowed to grow on the substrate 1 by chemical vapor deposition method (CVD method) to prepare the VACNTs 2 disposed on the substrate 1 (VACNTs preparation step).

Figure 1A:
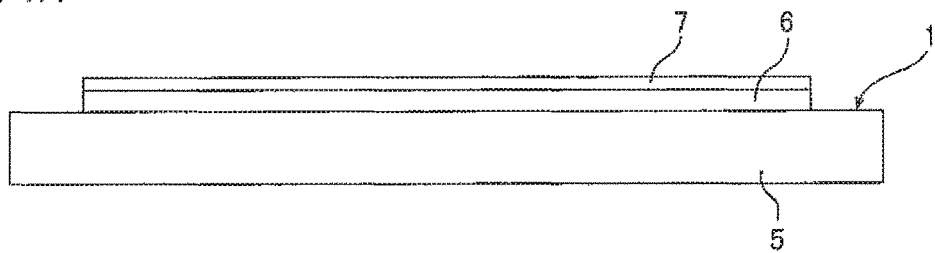
FIG. 1A is a diagram illustrating a step of preparing a carbon nanotube web (CNT web) in an embodiment of the method for producing the carbon nanotube yarn (CNT yarn) of the present invention, showing a step of forming a catalyst layer on a substrate. Following FIG. 1A.

To be specific, as shown in FIG. 1A, first, the substrate 1 is prepared. The substrate 1 is not particularly limited, and for example, a known substrate used for the CVD method is used, and a commercially available product can be used.

Examples of the substrate 1 include a silicon substrate, and a stainless steel substrate 5 on which a silicon dioxide film 6 is stacked, and preferably, a stainless steel substrate 5 on which the silicon dioxide film 6 is stacked is used. FIG. 1A to FIG. 1D and FIG. 2 show a case where the substrate 1 is the stainless steel substrate 5 on which the silicon dioxide film 6 is stacked.

Then, as shown in FIG. 1A, a catalyst layer 7 is formed on the substrate 1, preferably, on the silicon dioxide film 6. To form the catalyst layer 7 on the substrate 1, a metal catalyst is formed on the substrate 1 (preferably, silicon dioxide film 6) by a known film-forming method.

Examples of the metal catalyst include iron, cobalt, and nickel, and preferably, iron is used. Such a metal catalyst may be used singly, or a plurality of kinds of metal catalysts may be used together. Examples of the film-forming method include vacuum deposition and sputtering, and preferably, vacuum deposition is used. The catalyst layer 7 is disposed on the substrate 1 in this manner.

Figure 1B:
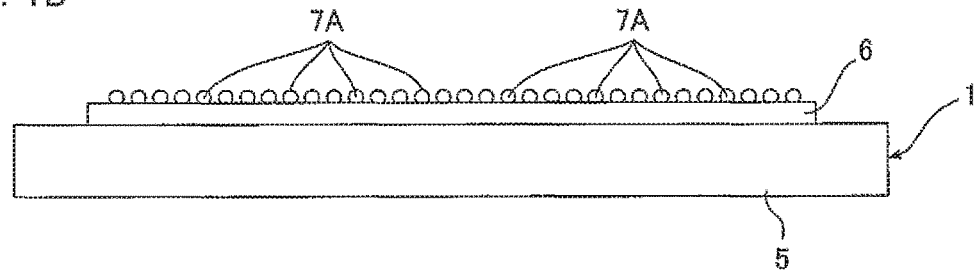
FIG. 1B shows a step of heating the substrate and having the catalyst layer aggregate into a plurality of granular bodies. Following FIG. 1B.

Then, the substrate 1 on which the catalyst layer 7 is disposed is heated, as shown in FIG. 1B, for example, at 700° C. or more and 900° C. or less. In this manner, the catalyst layer 7 coagulated to form a plurality of granular bodies 7A.

Figure 1C:
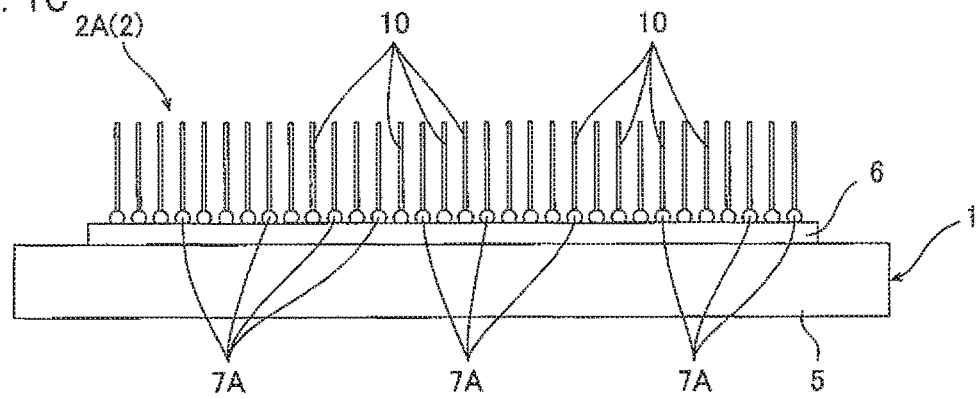
FIG. 1C shows a step of supplying a source gas to the plurality of granular bodies to allow vertically-aligned carbon nanotubes (VACNTs) to grow. Following FIG. 1C.

Then, a source gas is supplied to the heated substrate 1, as shown in FIG. 1C. The source gas contains hydrocarbon gas with a carbon number of 1 to 4 (lower hydrocarbon gas). Examples of hydrocarbon gas having 1 to 4 carbon atoms include methane gas, ethane gas, propane gas, butane gas, ethylene gas, and acetylene gas, and preferably, acetylene gas is used.

In addition, the source gas may contain hydrogen gas, inert gas (for example, helium, argon, etc.), water vapor, and the like, if necessary.

The supply time of the source gas may be, for example, 1 minute or more, preferably 5 minutes or more, and for example, 60 minutes or less, preferably 30 minutes or less.

In this manner, plurality of carbon nanotubes 10 (in the following, referred to as CNT 10) are grown from the plurality of granular bodies 7A. For convenience, FIG. 1C shows one CNT 10 grown from one granular body 7A, but it is not limited thereto, and a plurality of CNTs 10 can be grown from one granular body 7A.

The plurality of CNTs 10 can be any of the single-walled carbon nanotube and multi-walled carbon nanotube, and preferably, the plurality of CNTs 10 are multi-walled carbon nanotube. The plurality of CNTs 10 can include only one of the single-walled carbon nanotube and multi-walled carbon nanotube, or can include both of the single-walled carbon nanotube and multi-walled carbon nanotube.

The CNTs 10 have an average external diameter of, for example, 1 nm or more, preferably 5 nm or more, and for example, 100 nm or less, preferably 50 nm or less, more preferably 20 nm or less.

The CNTs 10 have an average length (average axial direction size) of, for example, 1 μm or more, preferably 100 μm or more, more preferably 200 μm or more, and for example, 1000 μm or less, preferably 500 μm or less, more preferably 400 μm or less. The number of the layers, average external diameter, and average length of the CNTs 10 is measured by known methods such as Raman spectroscopic analysis and electron microscope observation.

The plurality of CNTs 10 extend in the thickness direction of the substrate 1 so as to be parallel to each other on the substrate 1. The VACNTs 2 composed of the plurality of CNTs 10 are grown on the substrate 1 in this manner.

That is, the plurality of CNTs 10 are aligned (vertically aligned) in a direction orthogonal to the substrate 1, and the VACNTs 2 are vertically aligned relative to the substrate 1.

The VACNTs 2 disposed on the substrate 1 are prepared in this manner.

As shown in FIG. 2, the VACNTs 2 have a substantially rectangular shape extending in surface direction (vertical direction and lateral direction) orthogonal to the thickness direction (up-down direction) of the substrate 1 in plan view. The VACNTs 2 have a plurality of rows 2A in lateral direction, in which the plurality of CNTs 10 are arranged in line in vertical direction. In the VACNTs 2, the plurality of CNTs 10 are densified in the surface direction (vertical direction and lateral direction).

The VACNTs 2 have a bulk density of, for example, 10 mg/cm$^3$ or more, preferably 20 mg/cm$^3$ or more, and for example, 60 mg/cm$^3$ or less, preferably 50 mg/cm$^3$ or less. The bulk density of the VACNTs 2 is calculated from, for example, the mass per unit area (weight per unit area: mg/cm$^2$) and the length of the carbon nanotubes (which is measured by SEM (from JEOL Corporation) or by a non-contact film thickness meter (from KEYENCE Corporation)).

Separately from the VACNTs 2, a roller 4 is prepared (roller preparation step).

The roller 4 has a cylinder shape, and is capable of rotation around its axis as the center of rotation. The roller 4 has a groove 20 on its circumferential face 4A.

The groove 20 is dented from the circumferential face 4A of the roller 4 toward the inner side in the diameter direction of the roller 4 (in the following, simply referred to as diameter direction), and extend spirally so as to go around on the circumferential face 4A of the roller 4 a plural times in this embodiment. To be specific, the groove 20 extend from the one end portion to the other end portion of in the axial direction of the circumferential face 4A while going around the circumferential face 4A of the roller 4 clockwise seen from one side in axial direction.

The groove 20 goes around to a number of (number of winding), for example, 1 time or more, preferably 3 times or more. FIG. 2 and FIG. 3B show, for convenience, a case where the groove 20 goes around by a number of seven.

The groove 20 is dented, as shown in FIG. 3B, in a substantially trapezoid shape from the circumferential face 4A of the roller 4, and has a pair of inclined faces 20A, a pair of orthogonal faces 20B, and a bottom 20C.

The pair of inclined faces 20A are inclined faces that cross the axis of the roller 4 and face orthogonal to the axis, and are included so as to be close toward the inner side in the axial direction as they approach the inner side in the diameter direction from the circumferential face 4A of the roller 4. The inner end edge of the pair of inclined faces 20A in diameter direction are positioned to be spaced apart from each other in axial direction. The pair of orthogonal faces 20B extend continuously from the inner end edge of the pair of inclined faces 20A in diameter direction, along the diameter direction of the roller 4. The bottom 20C connects the inner end edges of the pair of orthogonal faces 20B in diameter direction along the axial direction.

The axial length L1 (to be more specific, length L1 between outer end edges of the pair of inclined face 20A in diameter direction) of the diameter direction-outer side end portion of the groove 20 is the maximum length in the axial direction of the groove 20, and the axial length L2 (to be more specific, length L2 of the bottom 20C in axial direction) of the diameter direction-inner side end portion of the groove 20 is the minimum length in the axial direction of the groove 20.

The axial length L2 of the groove 20 at diameter direction-inner side end portion is lateral length L3 of the CNT web 3 or less to be described later.

As shown in FIG. 2, in this embodiment, the roller 4 is disposed at one side in vertical direction, to be spaced apart from the VACNTs 2 so that the axial direction is parallel to the lateral direction of the VACNTs 2. That is, the axial direction of the roller 4 and the lateral direction of the VACNTs 2 are the same direction.

Figure 1D:
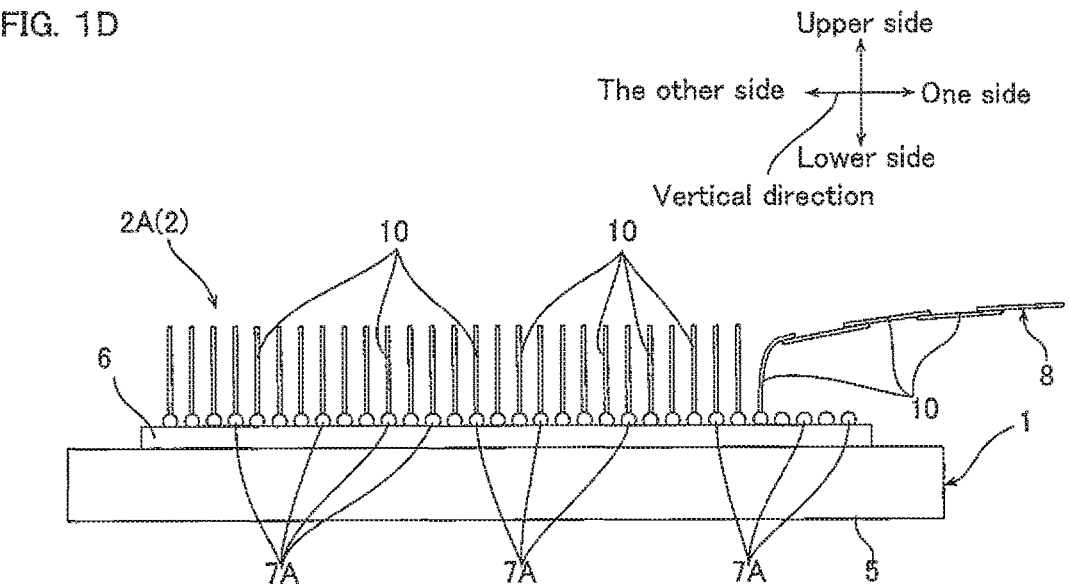
FIG. 1D shows a step of preparing a CNT web from the VACNTs.

Then, as shown in FIG. 1D, the CNT web 3 is prepared from VACNTs 2 (preparation step).

To prepare the CNT web 3 from the VACNTs 2, as shown in FIG. 2, in the VACNTs 2, the CNT 10 positioned at one side end portion of the row 2A in the vertical direction is collectively held by a drawing device, which is not shown, and pulled along a direction which intersects (crossing) the thickness direction of the substrate 1, preferably, along the vertical direction.

Then, the pulled CNT 10 is drawn out from the corresponding granular body 7A, as shown in FIG. 1D. At this time, the end (lower end) of the CNT 10 adjacent in vertical direction to drawn CNT 10 is attached to the end (lower end) of the drawn CNT 10 by the frictional force with the drawn CNT 10, Van der Waals force, etc., and drawn from the corresponding granular body 7A.

At this time, the CNT 10 having one end (lower end) attached to the CNT 10 is pulled downstream by its one end (lower end) in drawing direction, and the other end (upper end) of the CNT 10 is tilted upstream in drawing direction, to attach to the other end (upper end) of the adjacent CNT 10.

Then, the CNT 10 to which the CNT 10 is attached to the other end (upper end) is pulled downstream by the other end (upper end) in drawing direction, thereby drawing out one end (lower end) from the corresponding granular body 7A, and attaching to the one end (lower end) of the adjacent CNT 10.

Accordingly, the plurality of CNTs 10 are successively and continuously drawn from the VACNTs 2, to thereby form a carbon nanotube single yarn 8 (in the following, referred to as CNT single yarn 8) in which the plurality of CNTs 10 are connected linearly and continuously.

To be more specific, in the CNT single yarn 8, the continuous CNT 10 are attached to each other by one ends (lower end) or the other ends (upper end) of the CNT 10, and are aligned along the direction the CNT single yarn 8 extend. FIG. 1D shows, for convenience, one CNT 10 continuously connected to form the CNT single yarn 8, but actually, the bundle of the plurality of CNTs 10 is connected continuously to form the CNT single yarn 8.

Such a CNT single yarn 8 is a non twisted yarn, which is not twisted, and the twist angle is substantially 0°. The CNT single yarn 8 has an external diameter of, for example, 5 nm or more, preferably 8 nm or more, and for example, 100 nm or less, preferably 80 nm or less, more preferably 50 nm or less.

As shown in the enlarged view in FIG. 2, the plurality of CNT single yarns 8 are arranged in parallel in a direction intersecting (crossing) the direction the CNT single yarn 8 extends, because the CNT 10 in each row 2A is drawn at once simultaneously and in parallel.

In this embodiment, the plurality of CNT single yarns 8 extend along the vertical direction, and arranged in parallel in lateral direction. That is, the direction the plurality of CNT single yarns 8 are arranged and the lateral direction of the VACNTs 2 are the same.

In this manner, the plurality of CNT single yarns 8 arranged in parallel have substantially a sheet shape, and prepared as a CNT web 3. That is, the plurality of CNTs 10 are drawn from the VACNTs 2 continuously and linearly, thereby preparing the CNT single yarns 8, and the plurality of CNT single yarns 8 are arranged in parallel, thereby preparing the CNT web 3.

The CNT web 3 has a lateral length L3 of, for example, 0.1 cm or more, preferably 0.5 cm or more, and for example, 5 cm or less, preferably 3 cm or less.

Then, as shown in FIG. 2, the CNT web 3 is wound around the circumferential face 4A of the roller 4 so as to fit in the groove 20 (winding step).

To be specific, the CNT web 3 is wound around the circumferential face 4A of the roller 4 spirally so as to fit in the spiral groove 20. In this embodiment, the CNT web 3 is fitted in the groove 20 to allow the adjacent CNT single yarns 8 to converge in the direction of parallel arrangement, as is described. That is, the diameter direction-inner side end portion of the groove 20 has an axial length L2 of less than the lateral length L3 of the CNT web 3.

To be more specific, as shown in FIG. 3B, the plurality of CNT single yarns 8 adjacent to each other in the CNT web 3 converge toward the inner side in parallel arrangement direction by the inclination of the pair of inclined faces 20A of the groove 20, and then afterwards, reach the bottom 20C of the groove 20.

Afterward, as shown in FIG. 2, the roller 4 is rotated, and the free end portion of the converged CNT web 3A is drawn from the roller 4 so that the CNT web 3 in which the plurality of CNT single yarns 8 are converged (in the following, referred to as converged CNT web 3A) passes the spiral groove 20.

In this manner, the converged CNT web 3A is pulled downward in the moving direction, and along with it, the CNT web 3 prepared from the VACNTs 2 is pulled toward the roller 4, thereby continuously drawing the plurality of CNTs 10 from the VACNTs 2.

At this time, the moving speed of the CNT web 3 is, for example, 0.01 m/min or more, preferably 0.1 m/min or more, and for example, 200 m/min or less, preferably 100 m/min or less.

Then, when the CNT web 3 consecutively reaches the roller 4 and goes into the groove 20, in the same manner as in the above, the plurality of CNT single yarns 8 adjacent to each other are converged by the inclination of the pair of inclined faces 20A. Thereafter, the converged CNT web 3A goes on to pass through the spiral groove 20 consecutively and continuously, and wound around the circumferential face 4A of the roller 4.

Such a converged CNT web 3A is densified, as shown in FIG. 3B, in view of improvement in properties and production efficiency of the CNT twisted yarn 25 (described later), preferably, on the circumferential face 4A of the roller 4.

Examples of the densification include, applying pressure to the converged CNT web 3A, and supplying a volatile liquid to the converged CNT web 3A. Such a densification can be conducted only once, or preferably, several times.

In this embodiment, a pressure is applied primarily while the converged CNT web 3A is wound around the roller 4, and thereafter the volatile liquid is supplied, and then a pressure is applied secondarily, as is described. That is, this method for producing a carbon nanotube twisted yarn in this embodiment includes a step of pressing the converged CNT web 3A (pressing step), and a step of supplying a volatile liquid to the converged CNT web 3A (liquid supply step).

In the densification of this embodiment, first, the converged CNT web 3A wound around the circumferential face of the roller 4 is primarily pressed with a pressing rod 38 as an example of the presser.

The pressing rod 38 is in correspondence with the groove 20 of the roller 4, and is disposed so as to face the groove 20 of the roller 4 in diameter direction. The pressing rod 38 has a prism shape extending in the diameter direction of the roller 4. The pressing rod 38 is capable of going back and forth along the diameter direction of the roller 4.

In this embodiment, although to be described later, the pressing rod 38 is also used in secondary pressing. Therefore, the pressing rod 38 used in the primarily pressing is named a first pressing rod 38A, and the pressing rod 38 used in the secondary pressing is named a second pressing rod 38B, thereby distinguishing them.

Then, while rotating the roller 4, the first pressing rod 38A is allowed to go forth toward the roller 4 to insert the roller 4-side end portion of the pressing rod 38 into the corresponding groove 20.

In this manner, the converged CNT web 3A is sandwiched between the roller 4-side end portion of the first pressing rod 38A and the bottom 20C of the groove 20, and pressed from outside in the diameter direction of the roller 4. Therefore, density of the converged CNT web 3A improves.

The pressure in the primarily pressing to the converged CNT web 3A is, for example, 10 kg/cm$^2$ or more, preferably 50 kg/cm$^2$ or more, and for example, 1000 kg/cm$^2$ or less, preferably 500 kg/cm$^2$ or less.

Then, a volatile liquid is supplied to the primarily pressed converged CNT web 3A from a feeder 39.

The feeder 39 is in correspondence with a portion of the groove 20 at a downstream in the moving direction of the converged CNT web 3A, than the portion of the groove 20 where the first pressing rod 38A corresponds, and is disposed in spaced apart relation at the other side in axial direction of the roller 4 from the first pressing rod 38A. The feeder 39 is capable of supplying (spraying or dropping) the volatile liquid to the converged CNT web 3A. Furthermore, the feeder 39 is capable of supplying (spraying or dropping) the resin material to the converged CNT web 3A.

The volatile liquid may be, for example, water, an organic solvent, etc., and an organic solvent is preferable. The organic solvent may be, for example, lower (C1-C3) alcohols (for example, methanol, ethanol, propanol, etc.), ketones (for example, acetone, etc.), ethers (for example, diethylether, tetrahydrofuran, etc.), alkyl esters (for example, ethyl acetate, etc.), halogenated aliphatic hydrocarbons (for example, chloroform, dichloromethane, etc.), and a non-polar proton (for example, N-methylpyrolidone, dimethylformamide, etc.).

Among such volatile liquids, lower alcohols are preferable, and ethanol is more preferable. One kind of such volatile liquids may be used singly, or a plurality of kinds may be used together. Fine particles can be dispersed, and metal salt and/or resin material can be dissolved in the volatile liquid.

Examples of the resin material include thermosetting resin and thermoplastic resin. Examples of the thermosetting resin include epoxy resin, polyimide resin, phenol resin, urea resin, melamine resin, unsaturated polyester resin, polybenzimidazole resin, and polybenzoxazole resin. The thermosetting resin can be used singly, or can be used in combination of two or more. Of the thermosetting resin, preferably, polyimide resin is used.

Examples of the thermoplastic resin include polyester (for example, polyethylene terephthalate, etc.), polyolefin (for example, polyethylene, polypropylene, etc.), polyamide, polystyrene, polyvinyl chloride, polyvinyl alcohol (PVA), polyvinylidene chloride, polyacrylonitrile, polyurethane, aromatic polyetherketone (for example, poly ether ether ketone, etc.), polyoxadiazole, fluorine polymer (for example, polytetrafluoroethylene (PTFE), perfluoroalkoxy-alkane (PFA), polyvinyl fluoride, and polyvinylidene fluoride, etc.).

The resin material can be dissolved in the volatile liquid as described above, and can be supplied to the converged CNT web 3A along with the volatile liquid. When the resin material is thermoplastic resin, only thermoplastic resin in melted state can be supplied to the converged CNT web 3A, and when the resin material is thermosetting resin, liquid state (A stage) thermosetting resin can be supplied to the converged CNT web 3A.

Then, the feeder 39 supplies the volatile liquid to the primarily pressed converged CNT web 3A. In this manner, the volatile liquid is homogeneously given to the converged CNT web 3A wound around the circumferential face 4A of the roller 4. When the resin material is dissolved in the volatile liquid, the volatile liquid and the resin material are supplied to the converged CNT web 3A.

Then, the converged CNT web 3A to which the volatile liquid was supplied is subjected to secondary pressing by the second pressing rod 38B (pressing rod 38).

Of the groove 20, the second pressing rod 38B is in correspondence with the downstream-side portion in the moving direction of the converged CNT web 3A, than the portion where the feeder 39 is in correspondence, and is disposed in spaced apart relation at the other side in the axial direction of the roller 4 relative to the feeder 39. Then, in the same manner as in the primarily pressing as described above, the second pressing rod 38B is allowed to go forward to the roller 4 side, so that the converged CNT web 3A is sandwiched between the roller 4-side end portion of the second pressing rod 38B and the bottom 20C of the groove 20, thereby pressing from the outer side in the diameter direction of the roller 4. In this manner, density of the converged CNT web 3A reliably improves.

The pressure to the converged CNT web 3A in the secondary pressing can be the same as that in the primarily pressing described above, or can be different, but preferably, the pressure is larger than the pressure in primarily pressing.

The pressure to the converged CNT web 3A in the secondary pressing is, for example, 10 kg/cm$^2$ or more, preferably 50 kg/cm$^2$ or more, and for example, 1000 kg/cm$^2$ or less, preferably 500 kg/cm$^2$ or less.

Thereafter, as necessary, the converged CNT web 3A subjected to the secondary pressing was dried by a drier 40.

The drier 40 is a known drying device, and corresponds to a portion of the groove 20, i.e., a downstream-side portion in the moving direction of the converged CNT web 3A, than the portion where the second pressing rod 38B corresponds, and is disposed in spaced apart relation at the other side in the axial direction of the roller 4 relative to the second pressing rod 38B. Then, the drier 40 heats the secondary pressed converged CNT web 3A.

At this time, the volatile liquid is vaporized to densify the plurality of CNT single yarns 8, and in the CNT single yarn 8, the plurality of CNTs 10 are densified. Therefore, density of the converged CNT web 3A improves even more reliably. When the thermosetting resin is supplied to the converged CNT web 3A, heating by the drier 40 cures the thermosetting resin.

In the above-described manner, the converged CNT web 3A wound around the roller 4 is primarily pressed, and then thereafter a volatile liquid is supplied; and then secondary pressing is conducted, and drying is conducted as necessary, thereby conducting densification.

Then, as shown in FIG. 2, the converged CNT web 3A that passed the groove 20 of the roller 4 is drawn out from the roller 4, twisted, thereby producing a carbon nanotube twisted yarn 25 (in the following, referred to as CNT twisted yarn 25) (twisting step).

To twist the converged CNT web 3A, the downstream-side end portion in moving direction of the drawn converged CNT web 3A is rotated about the phantom line along the extension direction of the converged CNT web 3A as the center of rotation.

In this manner, the converged CNT web 3A is twisted, the plurality of CNT single yarns 8 are twisted together, thereby producing CNT twisted yarn 25.

The CNT twisted yarn 25 is twisted, for example, 500 T/m or more, preferably 1000 T/m or more, and for example, 10000 T/m or less, preferably 5000 T/m or less.

The CNT twisted yarn 25 has a bulk density of, for example, 0.5 g/cm$^3$ or more, preferably 0.7 g/cm$^3$ or more, more preferably 1 g/cm$^3$ or more.

In the above-described manner, the preparation of the CNT web 3 from the VACNTs 2 (preparation step), winding of the CNT web 3 to the roller 4 (winding step), densifying the converged CNT web 3A (pressing step and liquid supply step), and twisting of the converged CNT web 3A (twisting step) are conducted sequentially and continuously, thereby producing the CNT twisted yarn 25 continuously.

Such a CNT twisted yarn 25 is used in various industrial products, including fabrics (sheet) in which carbon fiber is used, and material for electroconductive wire of an electrical device (for example, motor, trans, sensor, etc.).

The method for producing the CNT twisted yarn 25 is continuously performed by a twisted yarn production device 30, which is an example of the carbon nanotube twisted yarn production device. The twisted yarn production device 30 includes a web preparation unit 31, a converging unit 32, and a twister 33. In the description of the twisted yarn production device 30, the same members are given the same reference numerals, and descriptions thereof are omitted.

The web preparation unit 31 is configured to prepare the CNT web 3, and to supply it to the converging unit 32. The web preparation unit 31 includes the VACNTs 2 disposed on the substrate 1, and a drawing device, which is not shown.

The converging unit 32 is disposed at one side in vertical direction of the VACNTs 2 in spaced apart relation from the web preparation unit 31. The converging unit 32 includes a guide unit 35, roller 4, pressing rod 38 (first pressing rod 38A and second pressing rod 38B), feeder 39, and drier 40.

The guide unit 35 includes a pair of guide shafts 36 and a support plate 37. The pair of guide shafts 36 have a cylindrical shape extending in up-down direction. The pair of guide shafts 36 are disposed in spaced apart relation from each other in lateral direction. The space between the pair of guide shafts 36 is smaller than the lateral length L3 of the CNT web 3, and as shown in FIG. 3B, larger than the axial length L1 of the outer side end portion in the diameter direction of the groove 20.

The support plate 37 is disposed, as shown in FIG. 2, below the pair of guide shafts 36, and rotatably support the pair of guide shafts 36.

The roller 4 is disposed at one side in vertical direction of the guide unit 35 in spaced apart relation so that the one side end portion of the axial direction (lateral direction) of the roller 4 face the guide unit 35.

The first pressing rod 38A and the second pressing rod 38B are disposed so as to face the roller 4 in the diameter direction, as shown in FIG. 3B, and are disposed in spaced apart relation from each other in the axial direction (lateral direction) of the roller 4. The feeder 39 is disposed between the first pressing rod 38A and the second pressing rod 38B so as to face the roller 4 in the diameter direction. The drier 40 is disposed at the other side in the axial direction of the roller 4 relative to the second pressing rod 38B in spaced apart relation, and face the roller 4 in the diameter direction.

As shown in FIG. 2, the twister 33 is disposed at one side in vertical direction in spaced apart relation from the other side end portion of the axial direction (lateral direction) of the roller 4, facing the roller 4 in diameter direction.

The twister 33 includes a rotation unit 46, a spindle 45, and a rotating shaft 47.

The rotation unit 46 has a substantially U-shape with an opening facing the roller 4. The spindle 45 has a cylinder shape, and is rotatably supported by side walls of the rotation unit 46. The rotating shaft 47 is disposed at one side in vertical direction relative to the rotation unit 46. The rotating shaft 47 has a substantially cylinder shape extending in vertical direction, and is fixed at a center in lateral direction of the rotation unit 46. In this manner, the rotation unit 46 is capable of rotation with the rotating shaft 47 as the center of rotation.

In such a twisted yarn production device 30, a drawing device, which is not shown, draws the CNTs 10 of the rows 2A of the VACNTs 2 simultaneously in parallel toward one side in vertical direction. In this manner, the substantially sheet shape CNT web 3, in which the plurality of CNT single yarns 8 are arranged in parallel in lateral direction, is prepared from the VACNTs 2.

Then, the CNT web 3 is allowed to pass through the pair of guide shafts 36, and thereafter is wound spirally on the circumferential face 4A of the roller 4 so as to fit the spiral groove 20.

Then, the free end portion of the CNT web 3 is drawn from the roller 4, and fixed at the circumferential face of the spindle 45. Then, a driving force is inputted to the roller 4, spindle 45, and rotating shaft 47, and the roller 4 and the spindle 45 are rotated clockwise seen from one side in axial direction (lateral direction), and the rotation unit 46 is rotated clockwise seen from one side in vertical direction.

In this manner, the CNT web 3 is pulled by rotation of the roller 4 and the spindle 45, thereby preparing the CNT web 3 from VACNTs 2 continuously, and the CNT web 3 moves toward the roller 4 at the above moving speed and goes into the groove 20 of the roller 4. That is, the CNT web 3 composed of the plurality of CNT single yarns 8 arranged in parallel is fitted in the groove 20 of the CNT web 3.

At this time, the plurality of CNT single yarns 8 adjacent to each other are converged inward in the parallel arrangement direction by the inclination of the pair of inclined faces 20A, thereby forming the converged CNT web 3A.

Then, as shown in FIG. 3B, the converged CNT web 3A goes on to pass the spiral groove 20 by rotation of the roller 4 and spindle 45, to be wound around the roller 4.

At this time, the first pressing rod 38A primarily presses the converged CNT web 3A wound around the roller 4 so as to sandwich the converged CNT web 3A with the bottom 20C of the groove 20 at the above pressure, and then the feeder 39 supplies the volatile liquid described above to the converged CNT web 3A. Then, the second pressing rod 38B secondarily presses the converged CNT web 3A to which the volatile liquid is supplied so as to sandwich the converged CNT web 3A with the bottom 20C of the groove 20 at the above described pressure, and then thereafter the drier 40 dries the converged CNT web 3A.

Then, the converged CNT web 3A passes the spiral groove 20, and is drawn from the roller 4 by rotation of the spindle 45. Then, the drawn converged CNT web 3A is twisted, as shown in FIG. 2, by rotation of the rotation unit 46 so that the plurality of CNT single yarns 8 are twisted together, and taken up by the spindle 45 by rotation of the spindle 45. That is, the drawn converged CNT web 3A is twisted by the twister 33.

In the above-described manner, the CNT twisted yarn 25 is produced by the twisted yarn production device 30.

(Operations and Effects)

In this embodiment, as shown in FIG. 2, the CNT web 3, in which the plurality of CNT single yarns 8 are arranged in parallel, is wound around the circumferential face 4A of the roller 4 so as to fit in the groove 20; the plurality of CNT single yarns 8 adjacent to each other is converged in parallel arrangement direction; and then thereafter the CNT web 3 is drawn out from the roller 4 and twisted to produce the CNT twisted yarn 25.

Therefore, by an easy method of winding the CNT web 3 around the circumferential face 4A of the roller 4, the plurality of CNT single yarns 8 can be converged, and thereafter, the CNT web 3 in which the plurality of CNT single yarns 8 are converged (converged CNT web 3A) is drawn from the roller 4 and twisted. Therefore, density of the CNT twisted yarn 25 can be improved, and a high density CNT twisted yarn 25 can be produced smoothly.

Furthermore, as shown in FIG. 3B, the CNT web 3 wound around the circumferential face 4A of the roller 4 (converged CNT web 3A) is pressed from outside in diameter direction of the roller 4.

Therefore, with an easy method, density of the converged CNT web 3A can be improved, and also density of the CNT twisted yarn 25 can be reliably improved.

As shown in FIG. 3B, the volatile liquid is supplied to the CNT web 3 wound around the circumferential face 4A of the roller 4 (converged CNT web 3A). Therefore, the volatile liquid is vaporized, and the plurality of CNT single yarns 8 are densified in the converged CNT web 3A, and the plurality of CNTs 10 are densified in the CNT single yarn 8.

As a result, with an easy method, density of the converged CNT web 3A can be reliably improved, and also density of the CNT twisted yarn 25 can be improved even more.

As shown in FIG. 2, the twisted yarn production device 30 includes the roller 4 and the twister 33. Then, the CNT web 3 in which the plurality of CNT single yarns 8 are arranged in parallel is wound around the circumferential face 4A of the roller 4 so as to fit in the groove 20, and therefore the plurality of CNT single yarns 8 adjacent to each other can be converged in parallel arrangement direction. Thereafter, the twister 33 can twist the CNT web 3 drawn out from the roller 4 (converged CNT web 3A), and therefore high density CNT twisted yarn 25 can be produced smoothly.

As shown in FIG. 3B, the twisted yarn production device 30 includes the pressing rod 38 that presses the CNT web 3 wound around the roller 4 (converged CNT web 3A). Therefore, density of the converged CNT web 3A can be improved, and also density of the CNT twisted yarn 25 can be reliably improved.

As shown in FIG. 3B, the twisted yarn production device 30 includes the feeder 39 that supplies the volatile liquid to the CNT web 3 wound around the roller 4 (converged CNT web 3A). Therefore, density of the converged CNT web 3A can be reliably improved, and also density of the CNT twisted yarn 25 can be improved even more.

Second Embodiment

Next, description is given below of the second embodiment of the present invention with reference to FIG. 4A. In the second embodiment, the same members as those in the above-mentioned first embodiment are given the same reference numerals, and descriptions thereof are omitted.

In the first embodiment, as shown in FIG. 3B, the converged CNT web 3A is primarily pressed while it is wound around the roller 4 for densification, and thereafter the volatile liquid is supplied, and then secondarily pressed, but it is not limited thereto.

Figure 4A:
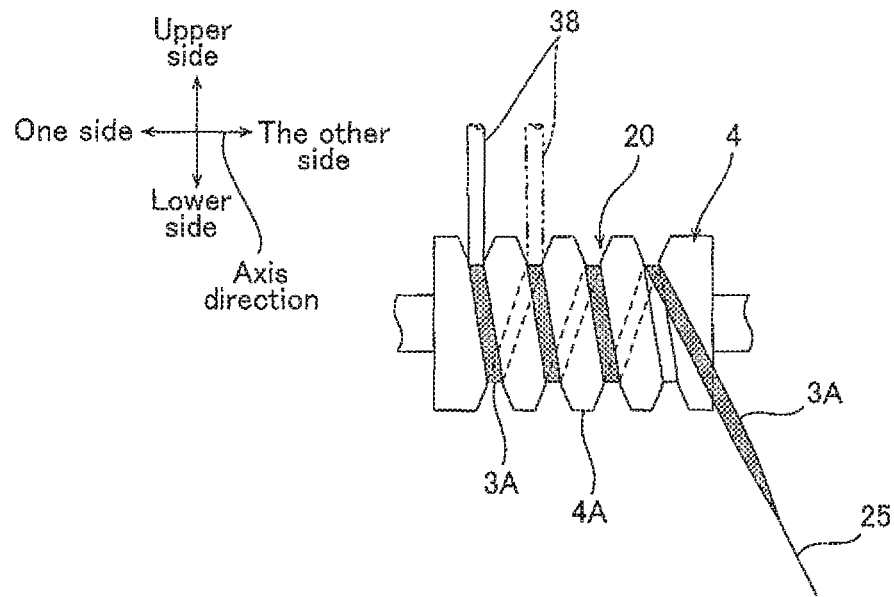
FIG. 4A is a diagram illustrating a second embodiment of the CNT yarn production device of the present invention.

In the second embodiment, as shown in FIG. 4A, the converged CNT web 3A is primarily pressed and secondarily pressed while it is wound around the roller 4, in the same manner as in the first embodiment, without supply of the volatile liquid.

The second embodiment also achieves the same operations and effects as in the first embodiment.

For the densification, only one of primarily pressing and secondary pressing can be conducted.

The volatile liquid can be supplied while the converged CNT web 3A is wound around the roller 4 without being pressed.

That is, types of the densification and how many times the densification is done is not particularly limited, and the order of the densification and arrangement of the members for the densification (pressing rod 38, feeder 39, and drier 40) are not particularly limited.

Third Embodiment

Next, description is given below of the third embodiment of the present invention with reference to FIG. 4B. In the third embodiment, the same members as those in the first embodiment above are given the same reference numerals, and descriptions thereof are omitted.

In the first embodiment, as shown in FIG. 3B, the pressing rod 38 is used an example of the presser, and the pressing rod 38 pressed the converged CNT web 3A wound around the circumferential face of the roller 4, but the presser is not limited thereto.

Figure 4B:
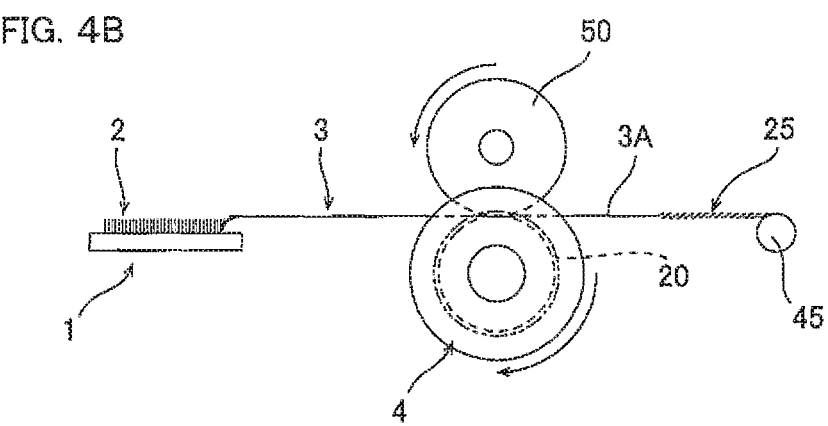
FIG. 4B is a diagram illustrating a third embodiment of the CNT yarn production device of the present invention.

In the third embodiment, as shown in FIG. 4B, the converged CNT web 3A wound around the circumferential face of the roller 4 is pressed with a rotation jig 50 as an example of the presser.

The rotation jig 50 has a disc shape, and is disposed so that its axis is parallel with the axis of the roller 4. The rotation jig 50 is disposed so that the converged CNT web 3A wound around the circumferential face of the roller 4 is sandwiched between the circumferential face of the rotation jig 50 and the bottom 20C of the groove 20. The rotation jig 50 is rotatable counterclockwise seen from one side in axial direction.

Then, when the roller 4 and the rotation jig 50 are rotated, the converged CNT web 3A goes forward in the groove 20, and is sandwiched between the circumferential face of the rotation jig 50 and the bottom 20C of the groove 20 successively, and pressed from outside in diameter direction of the roller 4.

The third embodiment also achieves the same operations and effects as in the first embodiment.

Fourth Embodiment and Fifth Embodiment

Next, description is given below of the fourth embodiment and fifth embodiment of the present invention with reference to FIG. 5A. In the fourth embodiment and fifth embodiment, the same members as those in the first embodiment above are given the same reference numerals, and descriptions thereof are omitted.

(1) Fourth Embodiment

In the first embodiment, as shown in FIG. 2, one CNT web 3 is prepared from one sheet of VACNTs 2, and the CNT web 3 is wound around the roller 4. However, it is not limited thereto.

Figure 5A:
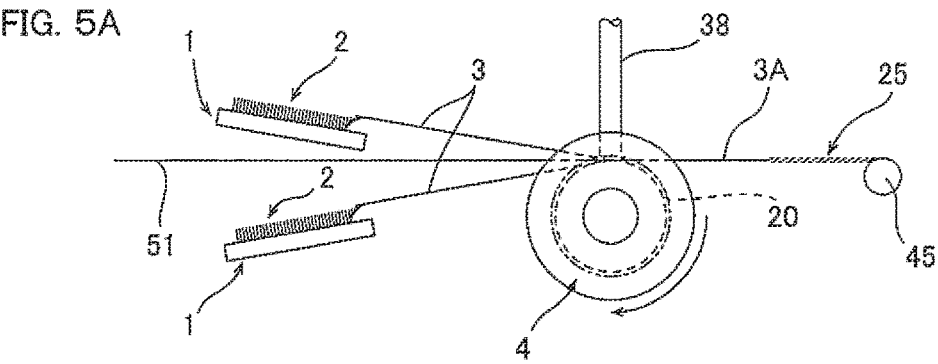
FIG. 5A is a diagram illustrating a fourth embodiment and a fifth embodiment of the CNT yarn production device of the present invention.

In the fourth embodiment, as shown in FIG. 5A, the plurality of sheets of VACNTs 2 are prepared, and the plurality of CNT webs 3 are prepared from the plurality of sheets of VACNTs 2, and the plurality of CNT webs 3 are wound around the circumferential face 4A of the roller 4 so that they are fitted in the groove 20, and stacked in diameter direction of the roller 4.

The number of the VACNTs 2 prepared is not particularly limited, but for example, two or more. In FIG. 5A, two VACNTs 2 are prepared, and this embodiment is described.

To be more specific, the plurality of (two) substrates 1 are prepared, and the VACNTs 2 are allowed to grow on the two substrates 1, in the same manner as in the first embodiment. In this manner, two VACNTs 2 disposed on the substrate 1 are prepared.

Then, from the two VACNTs 2, in the same manner as in the first embodiment, the CNT webs 3 are prepared.

Then, of the two CNT webs 3, one CNT web 3 is wound around the circumferential face 4A of the roller 4 so as to fit in the groove 20, and then the other CNT web 3 is wound around the circumferential face 4A of the roller 4 so as to fit in the groove 20. In this manner, the two CNT webs 3 are fitted in the groove 20, and stacked in diameter direction of the roller 4, and wound around the circumferential face 4A of the roller 4.

In the CNT web 3 wound around the roller 4, the plurality of CNT single yarns 8 are converged by the groove 20, and is prepared as the converged CNT web 3A.

Then, the converged CNT web 3A passes the groove 20 while being densified as necessary in the same manner as in the first embodiment, drawn out continuously from the roller 4, and twisted. In this manner, the CNT twisted yarn 25 is produced.

In the fourth embodiment, the plurality of CNT webs 3 are prepared from the plurality of VACNTs 2, and the CNT webs 3 are wound around the circumferential face 4A of the roller 4 so as to be fitted in the groove 20, and to be stacked in diameter direction of the roller 4.

Thereafter, the stacked CNT web 3 (converged CNT web 3A) is drawn out from the roller 4 and twisted to produce the CNT twisted yarn 25. Therefore, density of the CNT twisted yarn 25 can be improved, and the diameter of the CNT twisted yarn 25 can be increased. As a result, mechanical strength of the CNT twisted yarn 25 can be further improved.

The fourth embodiment also achieves the same operations and effects as in the first embodiment.

(2) Fifth Embodiment

In the fifth embodiment, as shown in FIG. 5A, an elongated member (in the following, referred to as elongated member 51) is wound around the circumferential face 4A of the roller 4 along with the CNT web 3 so as to fit in the groove 20.

The elongated member 51 has a linear or a flat belt shape extending in a predetermined direction, and has flexibility. The material of the elongated member 51 is suitably selected based on the application of the CNT twisted yarn 25, and examples thereof include glass fiber, carbon fiber, synthetic fiber, natural fiber, metal (for example, aluminum, titanium, copper, silver, gold, and alloys thereof, etc.), and polymer material (for example, thermoplastic resin, thermosetting resin, etc.).

To wind the elongated member 51 along with the CNT web 3 around the circumferential face 4A of the roller 4, for example, the CNT web 3 prepared from the VACNTs 2 is wound around the circumferential face 4A of the roller 4 to fit in the groove 20, and thereafter the elongated member 51 is wound around the circumferential face 4A of the roller 4 so as to fit in the groove 20. In this manner, the elongated member 51 is disposed on the CNT web 3 disposed in the groove 20 (converged CNT web 3A).

In the fifth embodiment, the elongated member 51 is disposed so as to be sandwiched by the two CNT webs 3. In this case, the elongated member 51 is wound around the circumferential face 4A of the roller 4 to be disposed on the converged CNT web 3A, and thereafter a separately prepared CNT web 3 is wound around the circumferential face 4A of the roller 4 so as to fit in the groove 20. In this manner, the elongated member 51 is sandwiched by the two CNT webs 3, and combined.

Then, the converged CNT web 3A combined with the elongated member 51 passes the groove 20 while being densified as necessary in the same manner as in the first embodiment, drawn from the roller 4, and twisted. In this manner, the CNT twisted yarn 25 is produced.

With the fifth embodiment, with an easy method, the CNT web 3 can be combined with the elongated member 51. Then, the CNT twisted yarn 25 is produced from the CNT web 3 combined with the elongated member 51, and therefore characteristics of the elongated member 51 can be given to the CNT twisted yarn 25.

The fifth embodiment also achieves operations and effects as in the first embodiment.

In the above embodiment, one elongated member 51 is combined with the plurality of (two) CNT webs 3, but without limitation, the plurality of elongated members 51 can be combined with the plurality of CNT webs 3, and one elongated member 51 can be combined with one CNT web 3.

In the above embodiment, the elongated member 51 is sandwiched by the two CNT webs 3, but the elongated member 51 can be disposed without limitation. However, the elongated member 51 is preferably disposed between the two CNT webs 3 in view of well balanced position of the elongated member 51 of the CNT twisted yarn 25.

Sixth Embodiment

Next, description is given below of the sixth embodiment of the present invention with reference to FIG. 5B. In the sixth embodiment, the same members as those in the first embodiment above are given the same reference numerals, and descriptions thereof are omitted.

In the first embodiment, as shown in FIG. 2, one CNT web 3 is prepared from one sheet of VACNTs 2, and the CNT web 3 is wound around the roller 4, but it is not limited thereto.

Figure 5B:
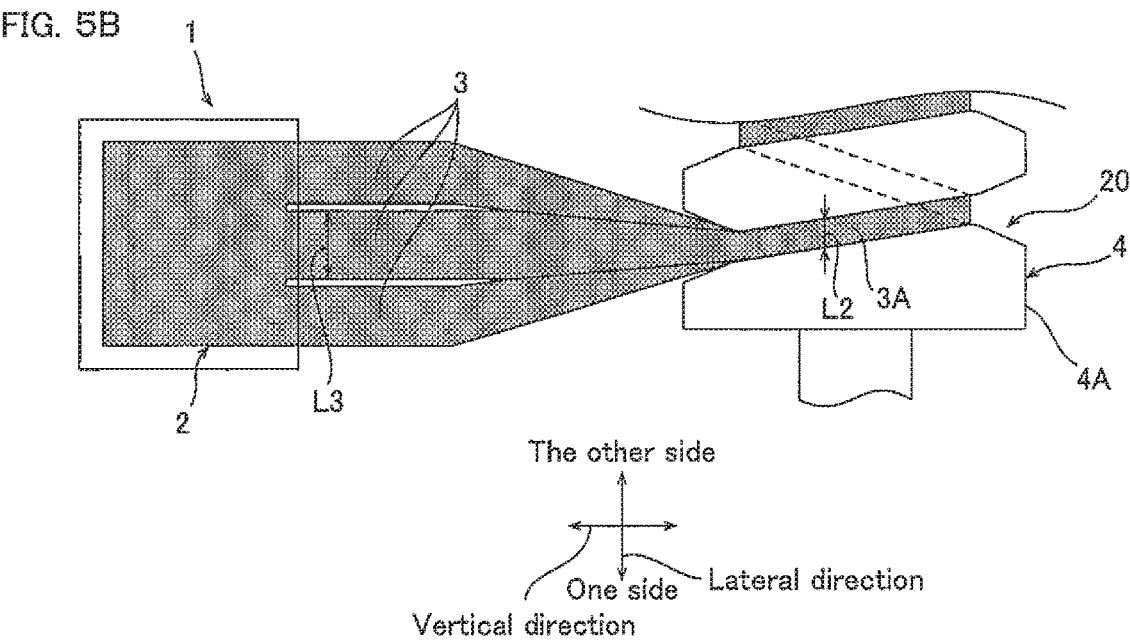
FIG. 5B is a diagram illustrating a sixth embodiment of the CNT yarn production device of the present invention.

In the sixth embodiment, as shown in FIG. 5B, the plurality of (three) CNT webs 3 are prepared from one sheet of VACNTs 2, and the CNT web 3 is wound around the circumferential face 4A of the roller 4 to be stacked in diameter direction of the roller 4.

To be more specific, the VACNTs 2 disposed on the substrate 1 are prepared in the same manner as in the first embodiment. Then, from the VACNTs 2, the plurality of (three) CNT webs 3 are prepared in a spaced apart relation in lateral direction.

Then, the plurality of (three) CNT webs 3 are wound around the circumferential face 4A of the roller 4 so as to fit in the groove 20 one by one. In this manner, a plurality of (three) CNT webs 3 are fitted in the groove 20, and stacked in diameter direction of the roller 4, to be wound around the circumferential face 4A of the roller 4.

In the CNT web 3 wound around the roller 4, the plurality of CNT single yarns 8 are converged by the groove 20, and prepared as the converged CNT web 3A.

Then, the converged CNT web 3A passes the groove 20 while being densified as necessary in the same manner as in the first embodiment, drawn out from the roller 4 continuously, and twisted. In this manner, the CNT twisted yarn 25 is produced.

With the sixth embodiment, the plurality of CNT webs 3 are prepared from one sheet of VACNTs 2, and these CNT webs 3 are wound around the circumferential face of the roller 4 to fit in the groove 20 and stacked in diameter direction of the roller 4.

Therefore, compared with the case where one CNT web 3 is prepared from one sheet of VACNTs 2, and the CNT web 3 is wound around the circumferential face of the roller 4 so as to fit in the groove 20, and the plurality of CNT single yarns 8 are collectively converged in parallel arrangement direction, the plurality of CNT single yarns 8 can be converged reliably. As a result, density of the CNT web 3 can be improved even more reliably.

The sixth embodiment also achieves the same operations and effects as in the first embodiment.

Seventh Embodiment

Next, description is given below of the seventh embodiment of the present invention with reference to FIG. 5C. In the seventh embodiment, the same members as those in the first embodiment above are given the same reference numerals, and descriptions thereof are omitted.

In the first embodiment to sixth embodiment, as shown in FIG. 5B, the axial length L2 of the diameter direction-inner side end portion of the groove 20 is less than the lateral length L3 of the CNT web 3, but it is not limited thereto.

Figure 5C:
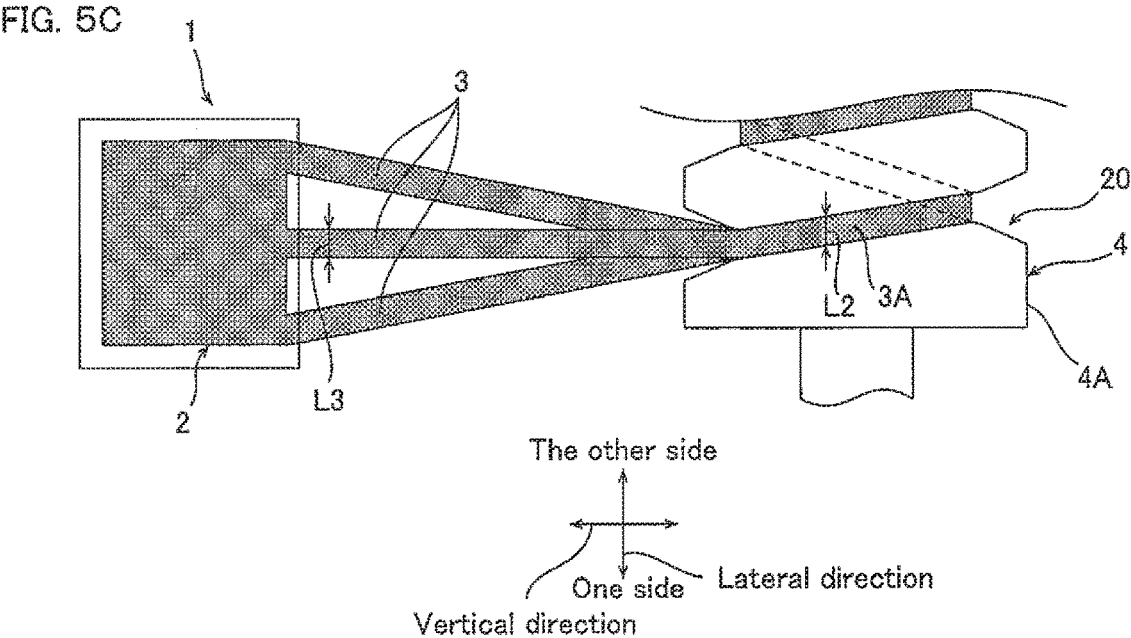
FIG. 5C is a diagram illustrating a seventh embodiment of the CNT yarn production device of the present invention.

In the seventh embodiment, as shown in FIG. 5C, the axial length L2 of the diameter direction-inner side end portion of the groove 20 is the same as the lateral length L3 of the CNT web 3.

In the seventh embodiment as well, similarly to the sixth embodiment, the plurality of CNT webs 3 are wound around the circumferential face of the roller 4 so as to fit in the groove 20, and stacked in the diameter direction of the roller 4. Therefore, various processes can be conducted to the CNT web 3 fitted in the groove 20 smoothly and easily.

Thereafter, the CNT web 3 is drawn out from the roller 4 and twisted to produce the CNT twisted yarn 25, and therefore density of the CNT twisted yarn 25 can be improved, and high density CNT twisted yarn 25 can be produced smoothly.

Eighth Embodiment

Figure 6:
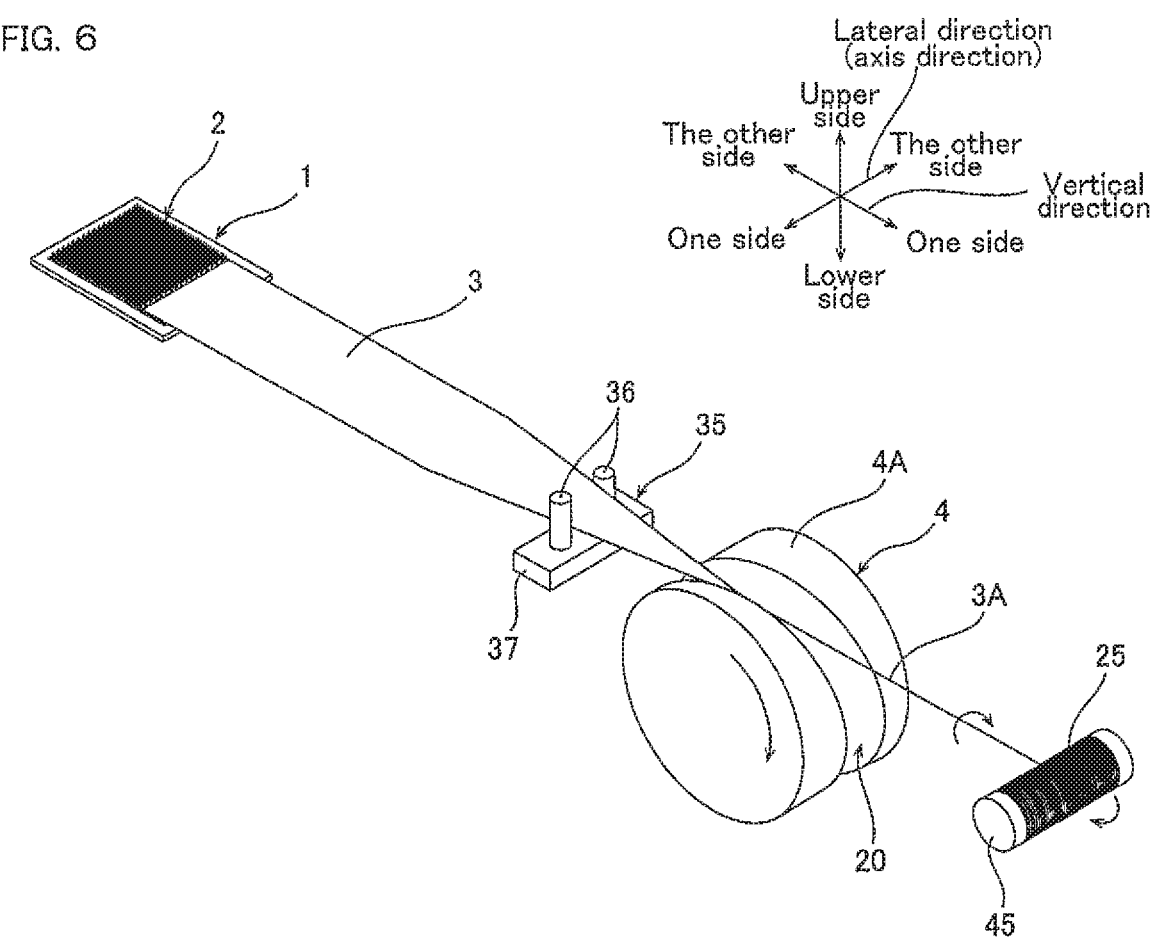
FIG. 6 is a diagram illustrating an eighth embodiment of the CNT yarn production device of the present invention.

Next, description is given below of the eighth embodiment of the present invention with reference to FIG. 6. In the eighth embodiment, the same members as those in the first embodiment above are given the same reference numerals, and descriptions thereof are omitted.

In the first embodiment, as shown in FIG. 2, the groove 20 extends spirally so as to go around the circumferential face 4A of the roller 4 a plurality of times, but without limitation, in the eighth embodiment, the groove 20 extends, on the circumferential face 4A of the roller 4, so as to go around one time along the circumferential direction of the roller 4.

The eighth embodiment as well can converge the plurality of CNT single yarns 8 adjacent to each other in parallel arrangement direction by winding the CNT web 3 prepared from the VACNTs 2 around circumferential face 4A of the roller 4 so as to fit in the groove 20. Therefore, operations and effects as in the first embodiment can be achieved.

Modified Example

In the first to eighth embodiments above, the groove 20 is dented, as shown in FIG. 3B, to be a substantially trapezoid shape from the circumferential face 4A of the roller 4, but the shape of the groove 20 is not particularly limited.

Figure 7A:
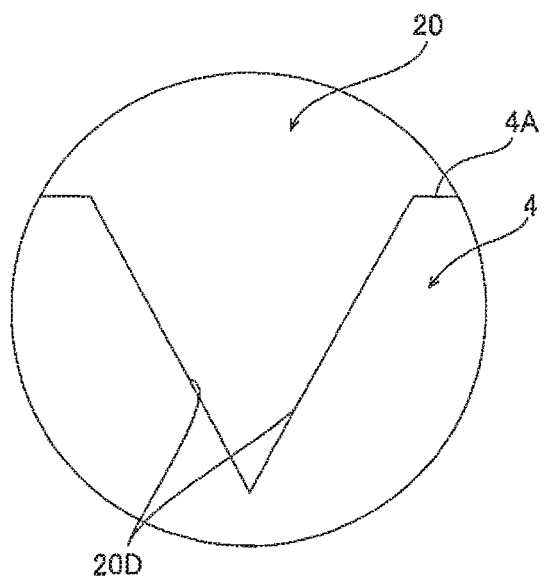
FIG. 7A is a diagram showing a first modified example of the groove of the roller of the CNT yarn production device of the present invention.

For example, the groove 20 can be dented to be a substantially letter-V shape from the circumferential face 4A of the roller 4, as shown in FIG. 7A, and can have a pair of inclined faces 20D. The pair of inclined faces 20D incline as they approach from the circumferential face 4A of the roller 4 to the inner side in diameter direction, so as to be closer to be an inner side in axial direction. The diameter direction-inner side end portion of the pair of inclined faces 20D are connected from each other.

Figure 7B:
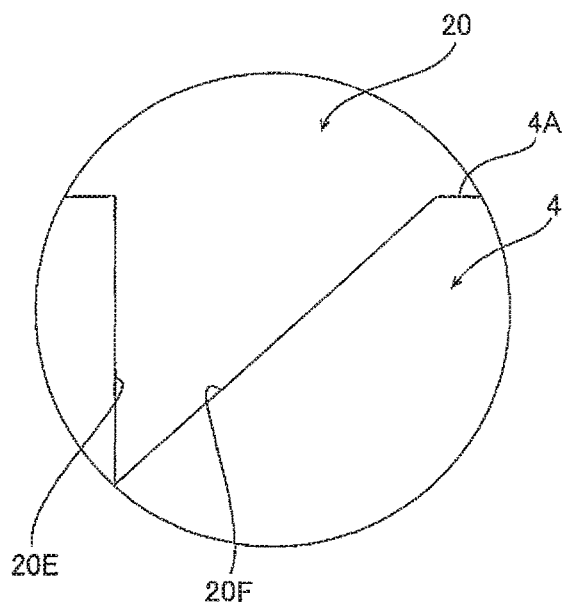
FIG. 7B is a diagram showing a second modified example of the groove of the roller of the CNT yarn production device of the present invention.

The groove 20 can also be dented to be a substantially letter-V shape from the circumferential face 4A of the roller 4, as shown in FIG. 7B, and can have an orthogonal face 20E and an inclined face 20F. The orthogonal face 20E extends from the circumferential face 4A of the roller 4 along the diameter direction of the roller 4, and the inclined face 20F inclines from the circumferential face 4A of the roller 4 as it approaches the inner side in diameter direction so as to be close to the orthogonal face 20E. Then, the diameter direction-inner side end portion of the orthogonal face 20E and the inclined face 20F are connected to each other.

Figure 7C:
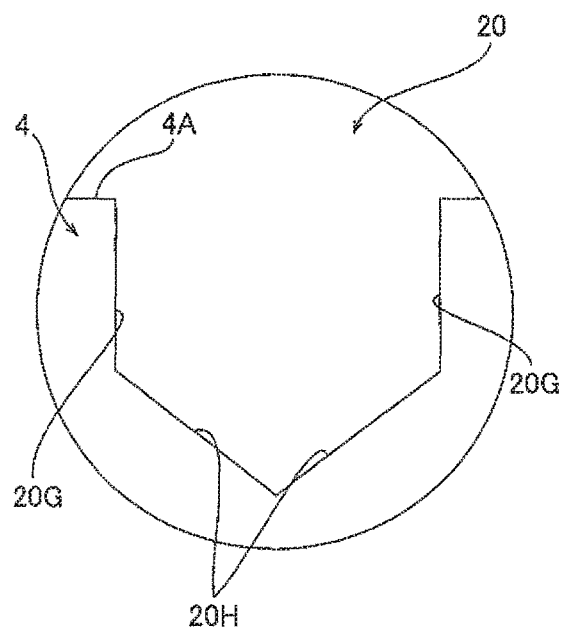
FIG. 7C is a diagram showing a third modified example of the groove of the roller of the CNT yarn production device of the present invention.

The groove 20 can be dented to be a substantially letter-U shape from the circumferential face 4A of the roller 4, as shown in FIG. 7C, and can have a pair of orthogonal faces 20G and a pair of inclined faces 20H. The pair of orthogonal faces 20G are disposed in spaced apart relation from each other in axial direction of the roller 4 to be substantially parallel to each other, and extend from the circumferential face 4A of the roller 4 to be parallel to each other along the diameter direction of the roller 4. The pair of inclined faces 20H incline continuously from the diameter direction-inner side end portion of the pair of orthogonal faces 20G as they approach the inner side in diameter direction so as to be closer to the inner side in axial direction. Then, the diameter direction-inner side end portion of the pair of orthogonal faces 20G are connected to each other.

Figure 7D:
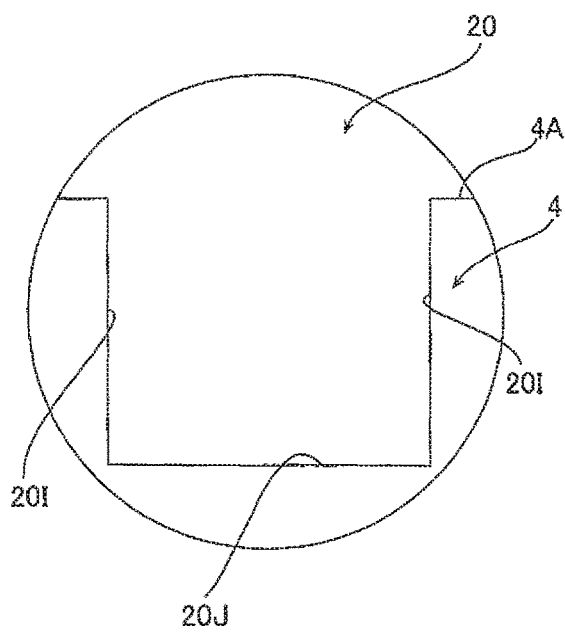
FIG. 7D is a diagram showing a fourth modified example of the groove of the roller of the CNT yarn production device of the present invention.

The groove 20 can be dented to be a substantially letter-U shape from the circumferential face 4A of the roller 4, as shown in FIG. 7D, and can have a pair of orthogonal faces 20I and a bottom 20J. The pair of orthogonal faces 20I are disposed in spaced apart relation from each other in the axial direction of the roller 4 to be parallel to each other from the circumferential face 4A of the roller 4 along the diameter direction of the roller 4. The bottom 20J connects the diameter direction-inner side end portion of the pair of orthogonal faces 20G along the axial direction.

In the above embodiments, the converged CNT web passed through the groove 20 of the roller 4 is drawn from the roller 4 and twisted, and collected by the spindle 45 as the carbon nanotube twisted yarn 25, but the converged CNT web passed through the groove 20 of the roller 4 can be drawn from the roller 4, and can be collected by the spindle 45 as the carbon nanotube non-twisted yarn (an embodiment of carbon nanotube yarn) without being twisted.

These modified examples can also achieve the same operations and effects as those in the first embodiment to eighth embodiment described above. These first embodiment to eighth embodiment and modified example can be combined suitably.

EXAMPLES

The present invention is further described in detail based on EXAMPLES below. However, the present invention is not limited to Examples. The specific numerical values of mixing ratio (content), physical property value, and parameter used in the description below can be replaced with the upper limit values (numerical values defined with "or less" or "below") or lower limit values (numerical values defined with "or more" or "more than") of the corresponding numerical values of mixing ratio (content), physical property value, and parameter described in "DESCRIPTION OF EMBODIMENTS" above.

Example 1

A silicon dioxide film was stacked on the surface of a stainless steel-made substrate (stainless steel substrate), and thereafter iron was vapor deposited on the silicon dioxide film as a catalyst layer.

Subsequently, the substrate was heated to a predetermined temperature. A source gas (acetylene gas) was supplied to the catalyst layer. In this manner, VACNTs having a substantially rectangular shape in plan view were formed on the substrate.

In the VACNTs, the plurality of CNTs extend so as to be substantially parallel to each other, and are aligned (vertically aligned) orthogonal to the substrate. The CNT was a multi-walled carbon nanotube, the CNT had an average external diameter of 10 nm and an average length of about 300 μm, and the VACNTs had a bulk density of 40 to 50 mg/cm$^3$.

A roller having a spiral groove on its circumferential face was prepared. The roller had an external diameter of 10 cm. The spiral groove goes around for three times, and the groove was dented to be a substantially trapezoid shape from the circumferential face of the roller. The groove had an axial length at an outer side end portion in the diameter direction of 1 cm, the groove had an axial length at a diameter direction-inner side end portion of 0.1 cm, and the groove had a diameter length of 1.5 cm.

Then, the roller is disposed in spaced apart relation from the VACNTs at one side in vertical direction so that the axial direction is parallel to the lateral direction of the VACNTs.

Then, from the VACNTs, a plurality of CNTs are drawn linearly and continuously by a drawing device, thereby preparing CNT single yarn, and the plurality of CNT single yarns are arranged in parallel to prepare a CNT web. The CNT web had a lateral (width direction) length of 2 cm.

Then, the CNT web is wound around the circumferential face of the roller spirally so as to fit in the spiral groove. Thereafter, the roller was rotated, and the CNT web was drawn from the roller so as to pass the spiral groove. The roller rotated at a speed of 20 rpm.

In this manner, the CNT web is continuously prepared from one sheet of VACNTs, wound around the roller, and the CNT web passed the groove was drawn from the roller continuously.

Then, the drawn CNT web was made into a twisted yarn with 4000 T/m. The CNT twisted yarn was produced in this manner. The CNT twisted yarn had a diameter of 29 to 32 μm, and a bulk density of 0.7 to 0.8 g/cm$^3$.

Table 1 shows the diameter and bulk density of the CNT twisted yarn in Examples 1 to 5 and Comparative Example 1, and also application of densification.

Example 2

A CNT twisted yarn was produced in the same manner as in Example 1, except that ethanol (volatile liquid) was supplied to the CNT web wound around the roller.

Example 3

A CNT twisted yarn was produced in the same manner as in Example 1, except that the CNT web wound around the roller was pressed with a pressing rod, from outside in the diameter direction of the roller. The pressure for the CNT web was 100 kg/cm$^2$.

Example 4

A CNT twisted yarn was produced in the same manner as in Example 1, except that the CNT web wound around the roller was pressed with a pressing rod (first pressing rod) from outside in the diameter direction of the roller (primarily pressing), and thereafter pressed at a downstream side in the moving direction of the CNT web again with a pressing rod (second pressing rod) from outside in the diameter direction of the roller (secondary pressing). The pressure to the CNT web in the primarily pressing was 100 kg/cm$^2$, and the pressure to the CNT web in the secondary pressing was 200 kg/cm$^2$.

Example 5

A CNT twisted yarn was produced in the same manner as in Example 1, except that ethanol was supplied to the CNT web wound around the roller between the primarily pressing and secondary pressing.

Comparative Example 1

VACNTs having a substantially rectangular shape in plan view were formed in the same manner as in Example 1, and a CNT web was prepared from the VACNTs. Then, the CNT web was continuously prepared from the VACNTs, and made into a twisted yarn with 5000 T/m. The CNT twisted yarn was produced in this manner.

Evaluation:

(1) Tensile Strength

The breaking strength of the CNT twisted yarn produced in Examples and Comparative Examples was measured as described below. The results are shown in Table 1.

One end of the CNT twisted yarn was fixed, and the other end of the CNT twisted yarn was fixed to a force gauge. The CNT twisted yarn was pulled at 0.2 mm/sec, and the load at which it was broken was regarded as a breaking strength.

The breaking strength was divided by the cross sectional area of the CNT twisted yarn, thereby calculating a tensile strength.

TABLE 1

| no. | | Example 1 | Example 2 | Example 3 | Example 4 | Example 5 | Comparative Example 1 |
|---|---|---|---|---|---|---|---|
| Densification | Primarily pressing | NO | NO | YES | YES | YES | NO |
| | Secondary pressing | NO | NO | NO | YES | YES | NO |
| | Liquid supply | NO | YES | NO | NO | YES | NO |
| Diameter [μm] | | 29-32 | 27-29 | 28-30 | 23-25 | 21-22 | 30-35 |
| Bulk density [g/cm$^3$] | | 0.7-0.8 | 0.9-1.0 | 0.8-0.9 | 1.0-1.1 | 1.2-1.3 | 0.5-0.6 |
| Tensile strength [GPa] | | 0.75 | 0.95 | 0.9 | 1.1 | 1.3 | 0.6 |

While the illustrative embodiments of the present invention are provided in the above description, such is for illustrative purpose only and it is not to be construed as limiting in any manner. Modification and variation of the present invention that will be obvious to those skilled in the art is to be covered by the following claims.

INDUSTRIAL APPLICABILITY

The method for producing a carbon nanotube yarn of the present invention can be suitably used for production of a carbon nanotube yarn, which is used in various industrial products.

DESCRIPTION OF REFERENCE NUMERALS 1 substrate
2 VACNTs
3 CNT web
4 roller

10 CNT
20 groove
30 twisted yarn production device
33 twister
38 pressing rod
39 feeder
50 rotation jig
51 elongated member

The invention claimed is:

1. A method for producing a carbon nanotube yarn, the method including the steps of:
 preparing a vertically-aligned carbon nanotube that is disposed on a substrate and is aligned vertically to the substrate,
 preparing a rotating body having a groove on a circumferential face,
 drawing a plurality of carbon nanotubes from the vertically-aligned carbon nanotube continuously and linearly to prepare a carbon nanotube single yarn, and arranging the plurality of carbon nanotube single yarns in parallel to prepare a carbon nanotube web,
 winding the carbon nanotube web around the circumferential face of the rotating body so as to fit in the groove, and
 drawing the carbon nanotube web from the rotating body.

2. The method for producing a carbon nanotube yarn according to claim 1, wherein the carbon nanotube web drawn from the rotating body is twisted.

3. The method for producing a carbon nanotube yarn according to claim 1, wherein in the step of winding the carbon nanotube web around the circumferential face of the rotating body, the carbon nanotube web is fitted in the groove to converge the plurality of carbon nanotube single yarns adjacent to each other in the parallel arrangement direction of the plurality of carbon nanotube single yarns.

4. The method for producing a carbon nanotube yarn according to claim 1, further including the step of applying a pressure to the carbon nanotube web wound around the circumferential face of the rotating body from outer side in the diameter direction of the rotating body.

5. The method for producing a carbon nanotube yarn according to claim 1, further including the step of supplying a volatile liquid and/or resin material to the carbon nanotube web wound around the circumferential face of the rotating body.

6. The method for producing a carbon nanotube yarn according to claim 1, wherein in the step of preparing the vertically-aligned carbon nanotube, the vertically-aligned carbon nanotubes are prepared in a plural number;
 in the step of preparing the carbon nanotube web, the plurality of carbon nanotube webs are prepared from the plurality of vertically-aligned carbon nanotubes; and
 in the step of winding the carbon nanotube web around the rotating body, the plurality of carbon nanotube webs are wound around the circumferential face of the rotating body so as to be stacked in the diameter direction of the rotating body.

7. The method for producing a carbon nanotube yarn according to claim 1, wherein
 in the step of preparing the carbon nanotube web, the plurality of carbon nanotube webs are prepared from the vertically-aligned carbon nanotube, and
 in the step of winding the carbon nanotube web around the rotating body, the plurality of carbon nanotube webs are wound around the circumferential face of the rotating body so as to be stacked in the diameter direction of the rotating body.

8. The method for producing a carbon nanotube yarn according to claim 1, wherein
 in the step of winding the carbon nanotube web around the rotating body, along with the carbon nanotube web, an elongated member is wound around the circumferential face of the rotating body.

\* \* \* \* \*